United States Patent
Mönnich et al.

(10) Patent No.: US 11,173,604 B2
(45) Date of Patent: Nov. 16, 2021

(54) METHOD FOR OPERATING A ROBOT, DATA MEMORY WITH CORRESPONDING PROGRAM CODE, ROBOT, AND ROBOT SYSTEM

(71) Applicant: Siemens Healthcare GmbH, Erlangen (DE)

(72) Inventors: Holger Mönnich, Friedberg (DE); Rafik Mebarki, Fürth (DE)

(73) Assignee: Siemens Healthcare GmbH, Erlangen (DE)

( * ) Notice: Subject to any disclaimer, the term of this patent is extended or adjusted under 35 U.S.C. 154(b) by 262 days.

(21) Appl. No.: 16/438,926

(22) Filed: Jun. 12, 2019

(65) Prior Publication Data
US 2019/0381659 A1 Dec. 19, 2019

(30) Foreign Application Priority Data
Jun. 13, 2018 (EP) ..................................... 18177548

(51) Int. Cl.
*B25J 9/16* (2006.01)

(52) U.S. Cl.
CPC ........... *B25J 9/1664* (2013.01); *B25J 9/1669* (2013.01)

(58) Field of Classification Search
CPC ...... B25J 9/1664; B25J 9/1669; B25J 9/1643; B25J 9/1607; B25J 9/1602; B25J 19/00; G05B 2219/39081; G05B 2219/40338
See application file for complete search history.

(56) References Cited

U.S. PATENT DOCUMENTS

| 2005/0246062 A1 | 11/2005 | Keibel |
| 2009/0214312 A1 | 8/2009 | Geisel |
| 2014/0010350 A1* | 1/2014 | De Godzinsky ......... A61B 6/06 378/62 |

(Continued)

FOREIGN PATENT DOCUMENTS

| EP | 1591209 A2 | 11/2005 |
| EP | 2093002 A2 | 8/2009 |

OTHER PUBLICATIONS

European Search Report for European Patent Application No. 18177548.7-1205 dated Oct. 16, 2018.

(Continued)

*Primary Examiner* — Basil T. Jos
(74) *Attorney, Agent, or Firm* — Lempia Summerfield Katz LLC

(57) ABSTRACT

The disclosure relates to a method for operating a robot, a data memory with a corresponding program code, the corresponding robot, and a corresponding robot system. Different coordinate system and their relationships to one another are used to position a tool in a target pose. A stationary reference coordinate system originating at a robot foot of the robot and a target coordinate system originating at the tool are specified. Herein, a z-axis of the target coordinate system corresponds to a specified axis of the tool. The orientations of an x-axis and a y-axis of the target coordinate system are calculated by a first cross product of the orientation of the specified axis and a direction vector, that is not parallel thereto, of coordinate axis of the reference coordinate system and by a second cross product of a result of the first cross product and the orientation of the specified axis.

11 Claims, 3 Drawing Sheets

(56) References Cited

U.S. PATENT DOCUMENTS

2015/0224649 A1* 8/2015 Watanabe .............. B25J 9/1607
700/259
2019/0143513 A1* 5/2019 Rabindran ............. B25J 9/1641
700/245

OTHER PUBLICATIONS

Pashkevich, Anatoly P., et al. "Computer-aided programming of robotic manufacturing cells for laser cutting applications." ETFA 2001. 8th International Conference on Emerging Technologies and Factory Automation. Proceedings (Cat. No. 01TH8597). IEEE, pp. 603-612 (2001).

* cited by examiner

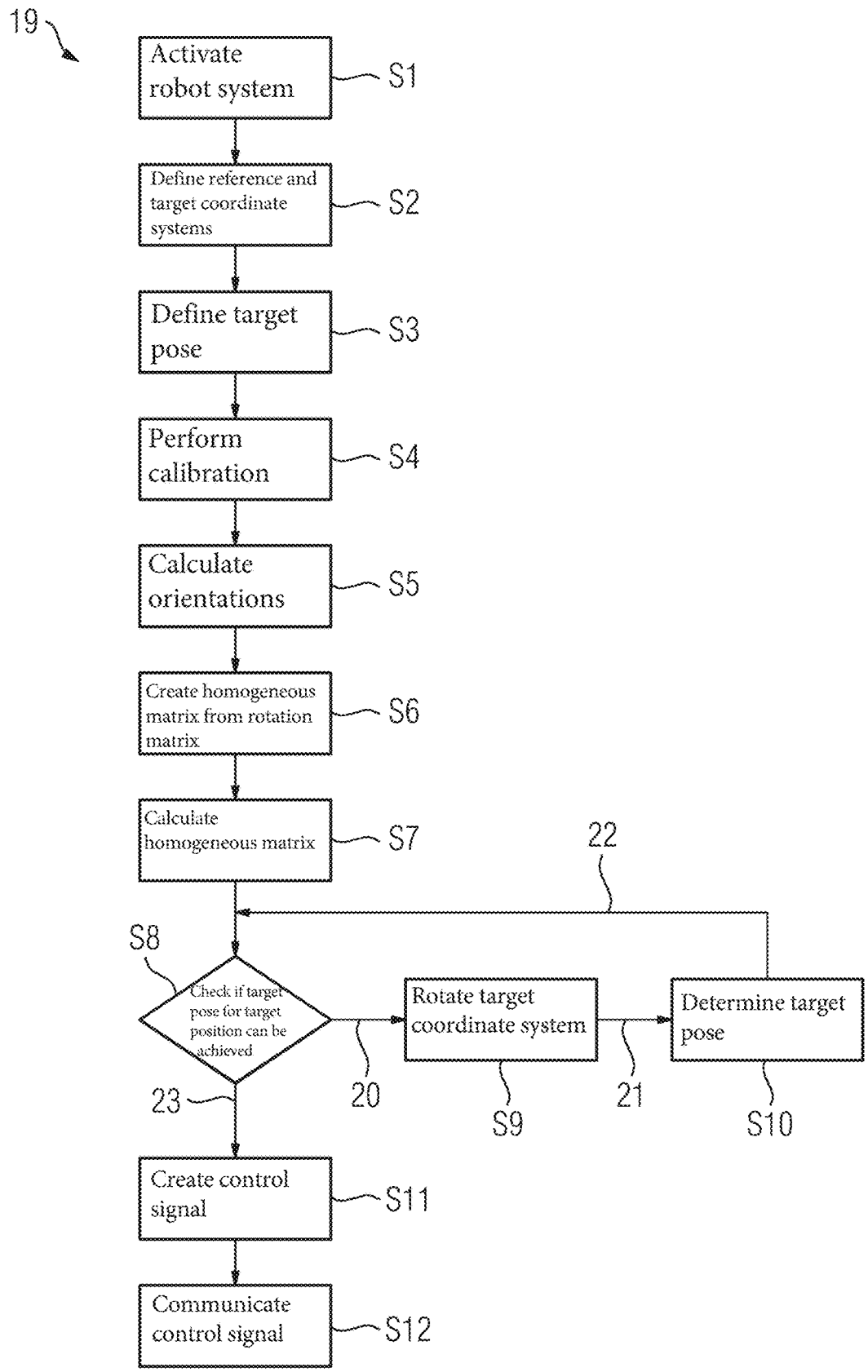

METHOD FOR OPERATING A ROBOT, DATA MEMORY WITH CORRESPONDING PROGRAM CODE, ROBOT, AND ROBOT SYSTEM

The present patent document claims the benefit of European Patent Application No. EP 18177548.7, filed Jun. 13, 2018, which is also hereby incorporated by reference.

TECHNICAL FIELD

The disclosure relates to a method for operating a robot, a data memory with a corresponding program code, a corresponding robot, and a corresponding robot system.

BACKGROUND

Nowadays, robots with movable robot arms are increasingly used in many fields of industry and engineering. These robots may position components or tools at a specified position and in a specified orientation or alignment, (e.g., in a specified pose), in space. This may be a 6D problem, i.e., a problem with or in six dimensions. These are three-point coordinates, or space coordinates, for the position and three angles for the orientation. If the respective component or tool is moved between two different poses, this may also entail rotations or rotational movements of the robot and the tool. The result of this may be that a marker arranged on the component or tool or on the robot, which may be used in way that is known per se to track the component or tool or the robot, moves out of a detection region of a corresponding detection facility, (e.g., a camera), or is masked by the robot, for example.

However, if a rotation of the component or tool to be moved about a specific specified axis is irrelevant for an application or function of the tool, the 6D problem is reduced by one dimension to a 5D problem because a rotation about the corresponding specified axis does not effectively have any impact on the correct arrangement of the component or tool in the specified pose. This circumstance may be exploited advantageously.

SUMMARY AND DESCRIPTION

It is the object of the present disclosure to enable positioning of a tool or component by a robot with improved trackability.

The scope of the present disclosure is defined solely by the appended claims and is not affected to any degree by the statements within this summary. The present embodiments may obviate one or more of the drawbacks or limitations in the related art.

A method is used to operate a robot for positioning a tool, (e.g., a tool that is functionally rotationally symmetrical about a specified axis), in a target pose. Herein, the robot includes a robot foot and a movable robot arm attached thereto on the distal end, (e.g., the end facing away or remote from the robot foot), of which a robot flange is arranged on which the tool is held directly or indirectly, e.g., at least indirectly. Herein, the robot foot is positioned fixed or rigidly, for example, with reference to a fixed spatial coordinate system of a space in which the robot is located and/or with reference to a workpiece or target object. Therefore, the robot, (in particular, the tool), is positioned relative to this workpiece or target object in order to interact therewith or to enable interaction therewith this in a specified manner, for example. The robot arm may be moved relative to the robot foot and thus also relative to the target object. To this end, the robot arm may include at least six degrees of freedom, realized, for example, by corresponding joints and/or axes of rotation. Therefore, the robot may be a conventional industrial robot or a medical robot, e.g., a lightweight robot.

Here, the term 'tool' may be interpreted very broadly and may, in principle, include any objects held or guided by the robot, for example, also a workpiece or semi-finished part or the like. In an example, the target object may be a patient. The tool may, for example, be a guide sheath for a needle, an injector or the like (NGS: "needle-guide sheath"). The target pose for this guide sheath may then be specified such that the needle or injector may be guided through the guide sheath arranged in the target pose and achieve a specified target point on the patient in or out of a specified direction of movement. In this example, the rotation about a longitudinal axis of the guide sheath is irrelevant, e.g., has no impact on an application or function of the guide sheath when the needle or injector is guided along this longitudinal axis through the guide sheath. In the context of the present disclosure, the corresponding positioning of the robot and the tool takes place completely outside the patient, e.g., without contact with the patient. Therefore, the application of the method does not explicitly constitute a surgical act. However, other applications are also conceivable, for example, for the assembly of complex assemblies and/or for material processing or the like. In the latter case, rotation that occurs, for example, during the positioning of a drill or the like, about its longitudinal axis is irrelevant because the drill rotates about this longitudinal axis during its application in any case.

Therefore, the method may be applied particularly advantageously for positioning a tool that is rotationally symmetrical and/or whose function, application, or use is not dependent upon, influenced by or impaired by a rotation or swivelable position in respect of at least one axis during positioning. Therefore, the corresponding axis may be an axis of symmetry in geometric and/or functional terms. Therefore, the term "axis of symmetry", which may be used below, may not be understood in purely geometric terms. Similarly, it is also possible, for example, for there to be a discrete symmetry with respect to rotations about this axis so that, therefore, only rotations by specific discrete angular amounts result in a geometric correspondence of the respective positions of the tool. It is also possible for the tool to be held by the robot so that it may be rotated or swiveled about the corresponding axis, e.g., on the robot flange. The tool may, for example, be moved manually by a user into a desired rotational or swivelable position after the positioning of the tool in the specified target pose.

With the method, the corresponding axis of the tool about which, as described, rotations are irrelevant is specified. Furthermore, with the method, a Cartesian reference coordinate system {0} originating on or in the robot foot is specified. Therefore, the reference coordinate system {0} includes three pairwise perpendicular coordinate axes in each case, which are hereinafter designated $x_0$, $y_0$ and $z_0$, and is in a specified and fixed or constant spatial positional relationship to the robot foot. Furthermore, a Cartesian target coordinate system {r} originating on a point of the tool, (e.g., on a tip of the tool), of a z-axis corresponding to the specified axis of the tool and an x-axis and y-axis each with initially indeterminate orientations is specified. Furthermore, 3D spatial coordinates $^0t_r$ of the point of the tool and an orientation of the specified axis, expressed in each case in the reference coordinate system {0}, are specified as part of the target pose for the tool. Then, the orientations of the x-axis and the y-axis of the target coordinate system $\{r\}$ expressed in the reference coordinate system $\{0\}$ are calculated.

To this end, a first cross product and a second cross product are calculated. The first cross product is calculated from the specified orientation of the specified axis, e.g., the orientation or direction of the z-axis of the target coordinate system $\{r\}$, and a direction vector of a coordinate axis of the reference coordinate system $\{0\}$, which is not parallel thereto or not collinear therewith. The second cross product is calculated from a result of the first cross product and the specified orientation of the specified axis expressed in the reference coordinate system $\{0\}$, e.g., the z-axis of the target coordinate system $\{r\}$. Then, a 4×4 matrix is created, which defines a pose $^0H_r$ of the target coordinate system $\{r\}$ with reference to the reference coordinate system $\{0\}$ from the orientations of the coordinate axes of the target coordinate system $\{r\}$ expressed in each case in the reference coordinate system $\{0\}$ and from the 3D spatial coordinates of the point of the tool also expressed in the reference coordinate system $\{0\}$ and from an additional 1×4 line vector. The additional 1×4 line vector may have the shape (0, 0, 0, 1) and is used to fill the matrix so that this obtains a quadratic shape. Herein, the mathematical object $^0H_r$ may be the actual 4×4 matrix. This matrix is also designated the corresponding homogeneous matrix or as the complete homogeneous matrix.

The different specifications may take place by retrieving corresponding data items from an available data memory and/or by manual inputs, for example, via a graphical user interface.

For the purposes of the present disclosure, a pose refers to a combination of a spatial location and an orientation or direction that may exist in the technical field of robotics. Herein, the orientation may be disclosed or defined by a corresponding vector, for example a unit vector or direction vector.

The notation used in the present case with a superscript prefix and a subscript suffix is explained here briefly by an example. According to this notation, $^AR_B$ designates an orientation or rotation of the coordinate system $\{B\}$ referring to or expressed in a coordinate system $\{A\}$, wherein R may be a rotation matrix. The same applies, for example, to a translation vector t, which is then written as $^At_B$ and a homogeneous matrix H, which is then written as $^AH_B$. Therefore, according to this notation, the coordinate axes of the coordinate system $\{B\}$ expressed in the coordinate system A are written as $^Ax_B$, $^Ay_B$, $^Az_B$.

In other words, therefore, a method is suggested for determining or calculating an orientation or alignment of the target coordinate system $\{r\}$ with reference to the stationary reference coordinate system $\{0\}$. Because the z-axis of the target coordinate system $\{r\}$ is specified by the specified axis or axis of symmetry of the tool, a central contribution of the present disclosure to the technical field of robot control lies in the determination of the x- and y-axes of the target coordinate system $\{r\}$ or in the determination of the orientation or alignment thereof. A special property and advantage of the present disclosure includes the fact that minimum rotation of the tool results on the application of the method during the operation of the robot. Therefore, the present disclosure ultimately avoids unnecessary rotational movements of the tool. This is, for example, particularly advantageous when a marker is arranged on the tool or in the region of the tool in order to track the tool or the robot. The inherently rotation-minimal movement of the tool or of the robot resulting from the present disclosure advantageously enables improved or more reliable visibility of the marker and thus enables improved, more reliable, and more dependable tracking of the tool or the robot. Particularly advantageously, this may be achieved by the present disclosure in an analytical, e.g., less ambiguous, way with a particularly low computational outlay and without additional outlay on components. Advantageously, therefore, the present disclosure may be implemented using existing hardware. For the purposes of the present disclosure, a marker is an object designed so that its orientation in space may be unambiguously determined from each perspective. The marker may be an optical or electromagnetic marker, which may be detected correspondingly, for example, with a camera or a corresponding sensor. Depending upon the application, it may be possible to use visible light, infrared light, radio frequencies, X-rays, or the like.

In an advantageous development, the orientation $^0y_r$ of the y-axis of the target coordinate system $\{r\}$ is calculated by the first cross product as $$^0y_r = {}^0z_r \times x_0.$$

The orientation $^0x_r$ of the x-axis of the target coordinate system $\{r\}$ is calculated by the second cross product as $$^0x_r = {}^0y_r \times {}^0z_r.$$

This applies at least in the event that $^0z_r$, e.g., the z-axis of the target coordinate system $\{r\}$, and hence the specified axis or axis of symmetry of the tool, is not collinear with the x-axis $x_0$ of the reference coordinate system $\{0\}$.

In the event that the z-axis of the target coordinate system $\{r\}$ corresponding to the specified axis of the tool, e.g., $z_r$ or $^0z_r$, is parallel to or collinear with the x-axis $x_0$ of the reference coordinate system $\{0\}$, the orientations $^0x_r$ and $^0y_r$ are calculated by the first and second cross product as $$^0x_r = y_0 \times {}^0z_r \text{ and } {}^0y_r = {}^0z_r \times {}^0x_r.$$

Herein, in each case $x_0$ and $y_0$ indicate the x- or y-axes of the reference coordinate system $\{0\}$ and $^0x_r$, $^0y_r$, $^0z_r$ indicate the coordinate axes of the target coordinate system $\{r\}$ expressed in the reference coordinate system $\{0\}$ in vector form. In other words, in the event of the specified axis of the tool by chance being aligned parallel to the x-axis $x_0$ of the reference coordinate system, instead of the x-axis $x_0'$ the y-axis $y_0$ of the reference coordinate system $\{0\}$ may be used as a basis or reference for calculating the orientations of the x- and y-axes of the target coordinate system. An angle between $^0z_r$ and $x_0$ may be derived because the alignment or orientation of the reference coordinate system $\{0\}$ is fixed and known. As a result, it is advantageously possible to achieve a rotation-minimal movement in each case, e.g., a movement that is particularly dependable with respect to the trackability and visibility, of the tool into the target pose. Particularly advantageously, therefore, this may then be achieved independently of the orientation of the specified axis of the tool with the same particularly low computing outlay.

In a further advantageous embodiment, a pose or homogeneous matrix $'H_f$ of the robot flange corresponding to the pose $^0H_r$ or to the corresponding homogeneous matrix of the target coordinate system $\{r\}$ and expressed therein is determined from a specified calibration, which indicates a spatial positional relationship between the point of the tool, (e.g., the tip of the tool), and the robot flange. Herein, the subscript f stands for the robot flange or a Cartesian coordinate system of the robot flange, which therefore has its origin in or on the robot flange and in which the pose of the robot flange may be described directly.

The calibration may be performed once before the above-described method acts and/or for example on each start or each commissioning of the robot and/or for example on a change of tool. The tool may be interchangeable so that the same robot is able to hold or guide different tools. On the other hand, the robot flange is an integral component of the robot. If the robot flange is in the pose $'H_f$, it is hence provided that the tool is in the specified target pose. Herein, the conversion of the target pose of the tool into the corresponding pose $'H_f$ of the robot flange is particularly advantageous because this may then be used as a direct input or target variable for already existing model-based control or kinematics of the robot, for example, independently of which tool is used or the spatial positional relationship to the robot flange in which the tool is mounted. Therefore, this enables the method to be applied with minimal modifications to existing robots or robot controls.

In an advantageous development, for the calibration a marker, (e.g., an optical marker), in a specified positional relationship to the point of the tool is arranged thereupon or on the robot. The optical marker is detected by a detection facility, which is arranged in a specified positional relationship to the robot foot in an auxiliary coordinate system $\{e\}$ originating at the point of the tool and with an initially indeterminate orientation relative to the target coordinate system $\{r\}$. A spatial positional relationship, (e.g., orientation), of the auxiliary coordinate system eh relative to the robot flange is determined from corresponding detection data of the marker. The pose $'H_f$ of the robot flange is then determined from the orientations of the axes of the target coordinate system $\{r\}$ expressed in the reference coordinate system $\{0\}$ and a specified forward kinematics of the robot using the common origin of the target coordinate system $\{r\}$ and the auxiliary coordinate system $\{e\}$. Therefore, the marker may be initially arranged in any spatial positional relationship and orientation. The auxiliary coordinate system $\{e\}$ may be specified or defined by the respective orientation of the marker, e.g., in dependence on the respective orientation of the marker. Thus, this advantageously enables calibration to be performed in a particularly simple and flexible way.

In an advantageous development, from the poses $^0H_r$ and $'H_f$, a pose $^0H_f$ of the robot flange $\{r\}$ corresponding to the determined pose $^0H_r$ of the target coordinate system is determined with reference to or expressed in the reference coordinate system $\{0\}$ as $$^0H_f = {}^0H_r {}^r H_f.$$

Herein, H is in each case the corresponding homogeneous 4×4 matrix. In other words, it is determined how the robot flange is positioned with reference to or expressed in the reference coordinate system $\{0\}$ for the tool to achieve the specified target pose. This advantageously enables particularly simple control of the robot because the robot flange is in a known positional relationship to the stationary robot foot and, for example, modelled by a specified model or specified kinematics of the robot.

In a further advantageous embodiment, a control signal for the robot is automatically created from the variables determined and a specified kinematic model of the robot by which the robot is moved out of its current pose in each case such that the tool arrives at or is transferred into the target pose specified therefor. In other words, therefore, the present disclosure is used, not only for theoretical or model-based applications, for example, but also for the actual operation of the robot. Therefore, this enables the described advantages resulting from the application of the method during the control of the robot to be realized in practice.

In a further advantageous embodiment, a specified kinematic model of the robot is used automatically to check whether the target pose specified for the tool may be achieved by the robot. Here, for example, restrictions may occur due to mechanical constraints in an environment of the robot, limitations in a range of movement of joints of the robot arm, singularities in the kinematic model and/or the like and may prevent the robot from achieving the specified target pose. If the robot is unable to achieve or set the target pose specified for the tool, the target coordinate system $\{r\}$, e.g., the orientation determined therefor, is rotated by specified, incrementally increasing angular amounts alternately in positive and negative directions about its z-axis until an achievable target pose is found. Herein, for each rotation or rotational movement, the direction of rotation is changed with reference to a preceding rotation or rotational movement in each case and the next higher of the specified angular amounts is used in each case. Therefore, the angle for the rotations is set, (e.g., increased), with respect to its amounts and its direction, according to a specified sequence. In addition, the check as to whether the resulting target pose may be achieved is performed again after each rotation or rotational movement. Therefore, after a respective rotation of the target coordinate system $\{r\}$, it is also possible to determine the in each case new corresponding pose $^0H_f$ for the robot flange. The angular increment specified, (e.g., used), may be a small angle, such as an angle or angular amount of maximum 15°, or 5°.

In other words, it is possible, for example, for a first rotation, for the target coordinate system $\{r\}$ to be rotated by 5° in the positive direction. If it is not also possible to achieve the then resulting target pose, the target coordinate system $\{r\}$ may be rotated in the negative direction. Therefore, the angular amount for the rotation may be increased in the negative direction by an angular increment to 10°, for example. Hence, the target coordinate system $\{r\}$ may then be rotated after this rotation by 5° in the negative direction relative to the original orientation before the rotation in the positive direction. If it is not also possible to achieve the resulting target pose, the target coordinate system $\{r\}$ may, on the basis of this new position, be rotated again in the opposite direction, e.g., in the positive direction, for example, by 15°, etc.

This procedure may advantageously enable a target pose to be found automatically and particularly reliably, with which, with a particularly high degree of probability, visibility, or trackability is further enabled or restricted as little as possible. Because the tool is rotationally symmetrical in respect of the z-axis of the target coordinate system $\{r\}$ and/or rotations of the tool about this axis are irrelevant, e.g., may be ignored for the control or the operation of the robot and/or are not subject to any restrictions, the rotation of the target coordinate system $\{r\}$ advantageously has no impact on the target pose finally adopted by the tool. Therefore, the rotation of the target coordinate system $\{r\}$ about its z-axis is only relevant for the movement of the robot arm for setting or approaching the target pose for the tool or the robot flange. This expresses the fact that, as explained, the original positioning problem is effectively a 5D problem.

A further aspect of the present disclosure is a data memory with a program code that codes or represents the method acts of at least one embodiment of the method. Therefore, the program code is a computer program product, which may be executed by a processor facility which in turn results in the automatic execution or performance of the corresponding method. Herein, the program code may be written in different programming languages. Depending upon the specific requirement, it is, for example, possible to use C, C++, Java, Python, Octavia, MATLAB, Fortran, or other languages.

A further aspect of the present disclosure is a robot with a control device for controlling the robot. Herein, this control device includes a data memory and a processor facility connected thereto for executing the program code stored or held in the data memory. In addition, the control device or the robot includes an interface for receiving specifications. This interface may be used to specify the reference coordinate system {0}, the target coordinate system {r}, and/or the target pose for the tool. The interface may also be a data interface to which a further electronic facility may be connected, for example, with a further data memory, a further control device, and/or a user interface. Therefore, the robot may be configured to perform or carry out the method and, accordingly, therefore, the robot may be the robot named in connection with the method. Accordingly, the robot may also include the properties and/or components or facilities named in connection with the method.

A further aspect of the present disclosure is a robot system, including a robot and a detection facility coupled thereto and arranged in a specified positional relationship to this robot for detecting at least one marker arranged on the robot. Herein, the robot system is configured automatically to determine an orientation of the marker, e.g., its spatial arrangement and position, from the detection data provided by the detection facility. The robot system may be configured to use this determined orientation of the marker to operate the robot or during the operation of the robot, for example, for the calibration explained in connection with the method. In other words, the robot system is therefore configured to carry out or perform at least one embodiment of the method. Accordingly, the detection facility and the marker of the robot system may be the detection facility or camera in connection with the method or the marker, in particular, the optical marker, named in connection with the method.

The properties and developments of the method and disclosed below and the corresponding advantages may in each case be transferred analogously to the other aspects of the disclosure, e.g., the data memory, the robot, and the robot system, and/or to components and facilities that are or may be used to perform the method and vice versa. Therefore, the disclosure also includes developments of the individual aspects of the disclosure including embodiments which are, for example, here only described for one of these aspects and/or are not described explicitly in the respective combination.

BRIEF DESCRIPTION OF THE DRAWINGS

Further features, details, and advantages of the present disclosure may be derived from the following description of exemplary embodiments and with reference to the drawings, in which:

FIG. 3 depicts an exemplary schematic flow chart for a corresponding positioning method.

DETAILED DESCRIPTION

Figure 1:
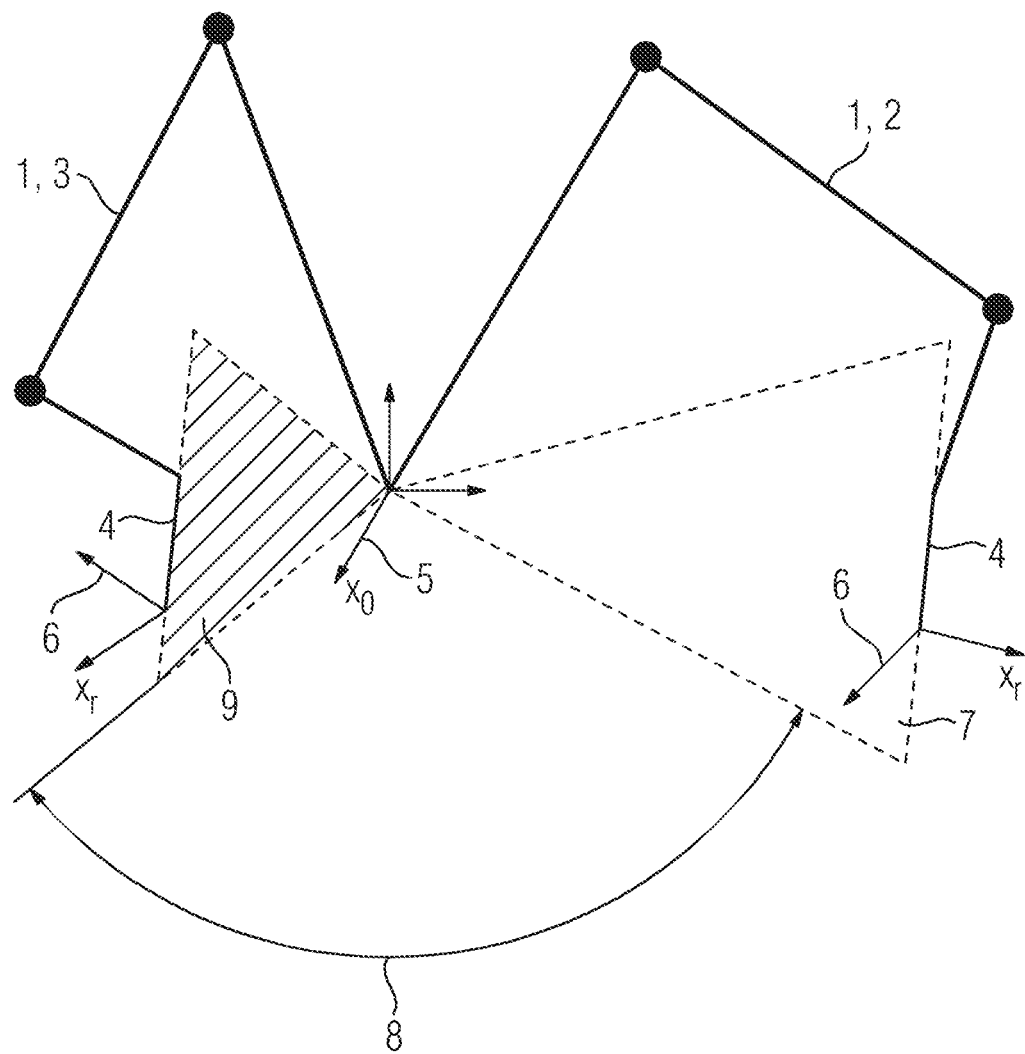
FIG. 1 depicts a schematic view to illustrate a positioning method for a tool according to the prior art.

In the exemplary embodiments disclosed herein, the described components of the embodiments in each case constitute individual features of the disclosure, which may be considered independently of each other and which develop the disclosure in each case also independently of one another and hence may also be regarded as part of the disclosure individually or in a different combination than that shown. Furthermore, the embodiments described may also be supplemented by further features from among the features of the disclosure already described.

In the figures, components or elements that are the same, functionally identical or correspond to one another are in each case identified with the same reference characters.

FIG. 1 depicts a schematic view to illustrate a robotic positioning method according to the prior art. Here, a conventional robot 1 is depicted in a starting pose 2 and an end pose 3. Herein, a tool 4 is held at one end of the conventional robot 1. Here, at an opposite end of the conventional robot 1, e.g., on a foot or a base of the conventional robot 1, there is a basic coordinate system 5 with an x-axis $x_0$ and two further coordinate axes arranged perpendicular thereto. Arranged on a tip of the tool 4 is a further coordinate system with an x-axis $x_r$ and a second axis 6 arranged perpendicular thereto. A third axis of this further coordinate system extends along a specified axis of the tool, which, here, is a main extension axis or axis of symmetry of the tool 4.

Some calculations are necessary in order to automatically move the conventional robot 1 or the tool 4 from the starting pose 2 into the end pose 3. To this end, in a known method that has been used hitherto, a plane 7 is spanned such that both the axis of symmetry of the tool 4 and an origin or point of origin of the basic coordinate system 5 lie in or are contained in this plane 7. The x-axis $x_0$ or the second axis 6 may then be defined such that they extend perpendicular to the plane 7.

In order to move the conventional robot 1 or the tool 4 from the starting pose 2 into the end pose 3, inter alia a rotation 8 indicated here by an arrow is provided. In the example depicted here, in the starting pose 2 and in the end pose 3, the axis of symmetry of the tool 4 has the same orientation, for example, with reference to the basic coordinate system 5 and/or with reference to an external camera, which is arranged in a fixed position with reference to the basic coordinate system 5. It is identifiable that the orientations of the x-axis $x_r$ and the second axis 6 in the end pose 3 are fundamentally different from the corresponding orientations of the x-axis $x_r$ and the second axis 6 in the starting pose 2. This may be attributed to the fact that, to determine its orientation for the end pose 3, the corresponding coordinate system at the tip of the tool 4 is rotated jointly with the plane 7 and accordingly together with the tool 4. Here, this may be identified at a location of a rotated plane 9 corresponding to the plane 7 after rotation 8. This rotation and the associated change in the orientations of the x-axis $x_r$ and the second axis 6 from the starting pose 2 to the end pose 3 enable a marker fixed on the tool 4 to move with a high degree of probability out of a field of view of a camera provided for the tracking thereof. Therefore, this conventional method is inherently rotation-based and thus may cause significant rotational movements. This is undesirable for the purposes of reliable and dependable trackability by the greatest possible degree of visibility of the corresponding marker. To avoid this, here another method is provided for determining the orientations of the coordinate system for the end pose 3 arranged at the tip of the tool 4 as explained below.

Figure 2:
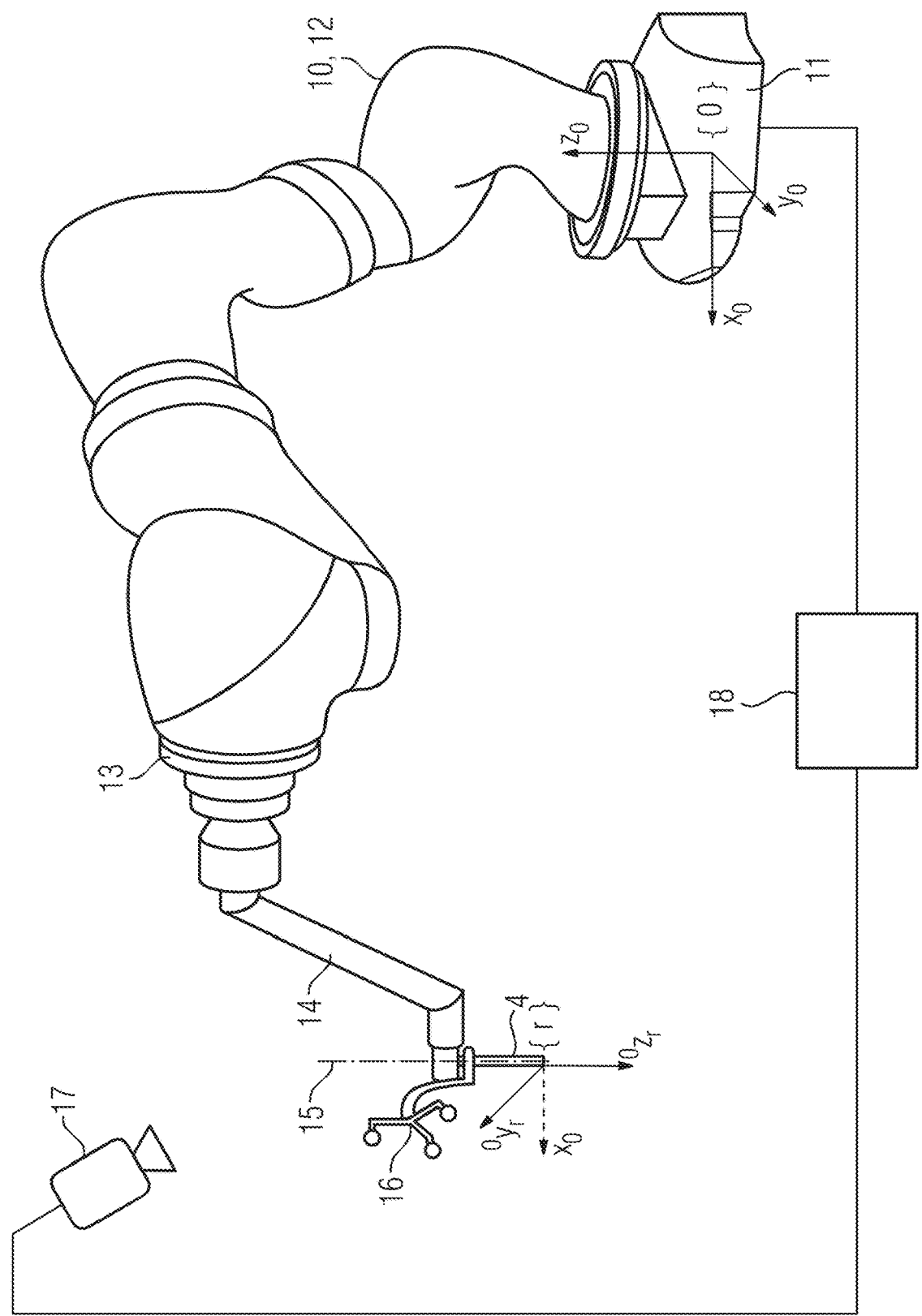
FIG. 2 depicts a schematic perspective view of an example of a robot system to illustrate a positioning method for a tool.

FIG. 2 depicts a schematic perspective view of a robot system with a robot 10. The robot 10 includes a static, (e.g., stationary), robot foot 11. In the present case, the robot foot 11 is in a fixed position with reference to a surrounding space in which the robot 10 is arranged. The robot 10 furthermore includes a movable robot arm 12 that extends from the robot foot 11. A robot flange 13 of the robot 10 is arranged at a distal end, (e.g., the end facing away from the robot foot 11), of the robot arm 12. In the present case, a connecting element 14 for holding the tool 4 is in turn arranged on this robot flange 13. In the present case, the tool 4 is rotationally symmetrical about a specified axis of rotation or axis of symmetry 15, which is here indicated schematically. However, instead of the rotationally symmetrical tool 4, it is also possible to use other tools or objects, which also do not need to be rotationally symmetrical, in the same way. It is then simply possible for a specific corresponding axis to be specified or defined. Rotations about this axis are then deemed to be or treated as irrelevant.

Furthermore, in the present case, an optical marker 16 is arranged on the tool 4. This marker 16 is embodied in a manner that is known per se so such that its orientation or pose may be determined unambiguously from each external viewing angle, e.g., from any perspective. In the present case, a camera 17 is provided to detect the marker 16 or its orientation or pose, e.g., ultimately to track the marker 16 and hence the tool 4. Thus, it is possible to determine the orientation of the marker 16 from corresponding image data recorded thereof by the camera 17 and hence to track the tool 4 or the robot 10. To this end, the marker 16 may be arranged in a specified spatial positional relationship to the tool 4, e.g., to the tip thereof. Furthermore, also depicted here is a control device 18 connected to the robot 10 and the camera 17 for controlling the robot 10. The robot 10, the control device 18, and the camera 17 may together form the robot system or be part of the robot system. The control device 18 may also be part of the robot 10 and then, for example, be integrated therein.

FIG. 3 depicts a schematic exemplary flow chart 18 for a method for operating the robot system for positioning the tool 4 in the end pose 3 or in a specified target pose. This method will now be explained with reference to FIG. 2.

The method is started in a method act S1. Here, for example, the robot system may be activated. Similarly, here, it is also possible for a kinematic model of the robot 10, (e.g., model-based forward kinematics of the robot 10), to be specified or provided.

In a method act S2, a Cartesian reference coordinate system {0} and a Cartesian target coordinate system {r} are specified or defined. Herein, the reference coordinate system {0} is arranged in a fixed position on the robot foot 11. Herein, both an origin of the reference coordinate system {0} and the coordinate axes $x_0$, $y_0$, $z_0$ or orientations thereof, overall therefore a pose of the reference coordinate system {0}, remain unchanged during the operation of the robot 10, in particular, during a movement of the robot arm 12.

An origin of the target coordinate system {r} is arranged at the tip of the tool 4. A z-axis $z_r$ of the target coordinate system {r} coincides with the specified axis of symmetry 15 of the tool 4.

In the present case, the aim is ultimately to determine or calculate a 6D pose or 6-DoF pose (DoF: "degrees of freedom") of the robot flange 13 such that, when it is achieved, the tip of the tool 4 adopts a specified 3D target position in space and, in addition, the axis of symmetry 15 extends in a specified direction or orientation. In the present example, the tool 4 is a needle-guide sheath (NGS). If the robot flange 13 and thus the tool 4 are in the respective target pose, the corresponding needle may be guided through the guide sheath, e.g., through the tool 4, in order to reach a specific specified position of a target object, (e.g., a patient), from the specified direction. Exact positioning of the tool 4 may be particularly important in a medical context, for example, in order to be able to treat the patient without injuries. However, exact positioning is also important and desirable in other fields of application. Due to the corresponding specification of the axis of symmetry 15 or, in the present case, due to the rotational symmetry of the tool 4 in respect of the specified axis of symmetry 15, the needle guided through the tool 4 is able to reach the specified target position from the specified direction regardless of the angle with which the tool 4 is rotated about the axis of symmetry 15. This is independent of design details of the tool 4, such as, for example, an arrangement of fastening or holding mechanisms, markings, and/or the like, which strictly speaking interrupt purely geometrical rotational symmetry of the tool 4. In the present case, the tool 4 includes at least one rotationally symmetrical internal space, through which the respective needle may be guided in the same way in each case regardless of its rotational position about the axis of symmetry 15. The rotation of the tool 4 about the axis of symmetry 15 or a corresponding angle is hence free and may, therefore, be selected or set in any way desired when positioning the robot flange 13. Hence, the problem of the positioning of the tool 4 in the specified target pose is therefore effectively a 5D problem. However, in order to keep the marker 16 in a field of view of the camera 17 as permanently and continuously as possible, it is, however, desirable to minimize or even avoid rotation of the tool 4 about the axis of symmetry 15.

A pose of the target coordinate system {r} to be achieved or given in the target pose of the tool 4 is initially only determined in so far that the origin of the target coordinate system {r} is arranged at the tip of the tool 4 and the z-axis $z_r$ of the target coordinate system {r} corresponds to the axis of symmetry 15 of the tool 4 or coincides therewith.

An assumption or precondition for the method is that any Cartesian coordinate system, inter alia, therefore, the target coordinate system {r}, may be expressed in or with reference to the reference coordinate system {0}.

In a method act S3, the target pose for the tool 4 is then specified as the z-axis $^0z_r$ of the target coordinate system {r} expressed in the reference coordinate system {0} and as 3D spatial or point coordinates $^0t_r$ of the target point of the tip of the tool 4, corresponding to the origin of the target coordinate system {r}, also expressed in the reference coordinate system {0}.

In a method act S4, calibration is performed in order to determine a spatial positional relationship between the tip of the tool 4 and the robot flange 13. This calibration is explained in more detail below.

In a method act S5, the still indeterminate orientations of the x- and y-axes of the target coordinate system {r}, $^0x_r$ or $^0y_r$, are calculated. To this end, it is initially checked whether in the specified target pose, the axis of symmetry 15, e.g., the z-axis of the target coordinate system {r}, is parallel to or colinear with the x-axis $x_0$ of the reference coordinate system {0}. If this not the case, the x- and y-axes of the target coordinate system {r} are calculated as:

$$^0y_r = {^0z_r} \times x_0 \text{ and } ^0x_r = {^0y_r} \times {^0z_r} \qquad (1),$$

wherein x stands for the cross product or vector product.

In the event that the axis of symmetry 15, e.g., $z_r$ or $^0z_r$, is parallel to or colinear with the x-axis $x_0$ of the reference coordinate system {0}, the x- and y-axes of the target coordinate system {r} are calculated as:

$$^0x_r = y_0 \times {^0z_r} \text{ and } ^0y_r = {^0z_r} \times {^0x_r} \qquad (2).$$

Herein, the coordinate axes $x_0$, $y_0$, $z_0$ of the reference coordinate system $\{0\}$ may then, for example, be given or defined as column vectors $x_0=(1\ 0\ 0)^T$, $y_0=(0\ 1\ 0)^T$ and $z_0=(0\ 0\ 1)^T$.

The coordinate axes of the target coordinate system $\{r\}$ may then be combined as column vectors of a rotation matrix $^0R_r$, for example:

$$^0R_r=[^0x_r\ ^0y_r\ ^0z_r],$$

which indicates the target orientation of the target coordinate system $\{r\}$ based on the reference coordinate system $\{0\}$.

In a method act S6, a homogeneous matrix $^0H_r$ is then created from the rotation matrix $^0R_r$, the three spatial coordinates $^0t_r$ as a further column vector and an additional 1×4 line vector of the shape (0,0,0,1). The homogeneous matrix $^0H_r$ is, therefore, a 4×4 matrix, which defines the pose of the target coordinate system $\{r\}$ with reference to the reference coordinate system $\{0\}$.

In a method act S7, a homogeneous matrix $^0H_f$ is calculated, which indicates a target pose of the robot flange 13 corresponding to the target pose of the target coordinate system $\{r\}$ calculated in the method act S6 with reference to the reference coordinate system $\{0\}$. Herein:

$$^0H_f = {^0H_r}\, {^rH_f},$$

wherein $^rH_f$ indicates the corresponding pose of the robot flange 13 with reference to the target coordinate system $\{r\}$.

Herein, $^rH_f$ may be determined in the context of the calibration in the method act S4. Let $\{e\}$ be a Cartesian auxiliary coordinate system originating at the tip of the tool 4. Herein, the auxiliary coordinate system $\{e\}$ may initially have an arbitrary orientation. Advantageously, the auxiliary coordinate system $\{e\}$ may be defined by a calibration element. This calibration element may be an optical pointer, for example, a needle-shaped or needle-like auxiliary tool with an optical marker arranged thereon. This auxiliary tool may then be guided like the aforementioned needle through the tool 4 so that a tip of the auxiliary tool coincides with the tip of the tool 4. Herein, a variable or dimension of the auxiliary tool is known so that the detection of the optical marker in a specified positional relationship to the tip of the auxiliary tool arranged on the auxiliary tool enables the current position of the tip of the auxiliary tool, and hence in this case the tip of the tool 4 and the origin of the target coordinate system $\{r\}$ and also the auxiliary coordinate system $\{e\}$, to be determined in each case. To this end, the optical marker arranged on the auxiliary tool may be detected by the camera 17, wherein, to determine the pose thereof, corresponding detection data provided by the camera 17, e.g., camera data or image data, may be processed by the control device 18.

Additionally, or alternatively to this auxiliary tool, the optical marker 16 may be used when this is arranged on the tool in a specified, (e.g., constant), positional relationship to the tip of the tool 4. It then is possible to determine a homogeneous matrix $^fH_e$ from the determined pose of the marker 16 or of the arranged optical marker arranged on the auxiliary tool and a current pose of the robot flange 13 at the corresponding time of this calibration in each case. This homogeneous matrix $^fH_e$ indicates the current pose of the auxiliary coordinate system $\{e\}$ at the time of the calibration with reference to a Cartesian coordinate system $\{f\}$ of the robot flange 13. Herein, a translatory portion of the homogeneous matrix $^fH_e$ is given as $^ft_e$, $^ft_e$; e.g., is a distance or translation vector between the auxiliary coordinate system $\{e\}$ and the coordinate system $\{f\}$ of the robot flange 13. The coordinate system $\{f\}$ of the robot flange 13 may describe the pose thereof or in order to describe the pose thereof without further coordinate transformations. An origin of this coordinate system $\{f\}$ of the robot flange 13 may be arranged in a center of the robot flange 13. The current pose of the robot flange 13 may be determined or known from a robot control of the robot 10, e.g., in each case using current measured joint coordinates or joint settings and a kinematic model or forward kinematics of the robot 10.

Because both the target coordinate system $\{r\}$ and the auxiliary coordinate system $\{e\}$ have their respective origins at the tip of the tool 4, the following applies:

$$^ft_r = {^ft_e} \tag{3}$$

In addition, it is possible to derive a direction of the auxiliary tool or the tool 4, e.g., the axis of symmetry 15 at the time of the calibration from the detected pose of the marker 16 or of the marker arranged on the auxiliary tool. This is expressed in the reference coordinate system $\{0\}$ as $^0z_r$. A corresponding application of equations (1) or (2) supplies the associated rotation matrix $^0R_r$, and finally $$^fR_r = {^0R_f^T}\, {^0R_r},$$

wherein $^0R_f$ indicates the rotational portion of the pose of the robot flange 13 or of the coordinate system of the robot flange 13 with reference to the reference coordinate system $\{0\}$ or the corresponding homogeneous matrix and, as described, is known or may be determined from the robot control or the forward kinematics of the robot 10.

The homogeneous matrix $^rH_f$ is then determined from the result $^fR_r$ and relationship (3) so that the homogeneous matrix $^0H_f$ is determined completely.

In a method act S8, it is then checked, (for example, using a model of the robot 10), whether the associated target pose $^0H_f$ of the robot flange 13 determined for the specified target position of the tool 4 may be achieved. Herein, a current pose of the robot 10 and any possible technical limitations of the robot 10 and/or limitations caused by a current environment of the robot 10 are taken into account. If it is not possible to achieve or set the pose $^0H_f$ for the robot flange 13, the method follows a path 20 to a method act S9.

In the method act S9, the target coordinate system $\{r\}$ is rotated according to a specified sequence based on the determined orientation for the target pose. In the present case, the sequence given is $(\Theta, -\Theta, 2\Theta, -2\Theta, \ldots, k\Theta, -k\Theta, \ldots)$, wherein $\Theta$ is a relatively small angle of, in the present case, 5° for example, the preliminary sign indicates a direction of rotation and k is a positive integer. This introduces a minimally required rotation of the target coordinate system $\{r\}$. After each such rotation, the method follows a path 21 to a method act S10.

In the method act S10, the associated resulting target pose $^0H_f$ for the robot flange 13 is determined for the current rotated pose or orientation of the target coordinate system $\{r\}$ in each case.

Then, following a path 22, another check is performed as to whether the new, (e.g., in each case current), target pose $^0H_f$ of the robot flange 13 may be achieved. To this end, therefore, the method acts S8, S9, and S10 may be passed through in a looped or iterative manner until a target pose $^0H_f$ for the robot flange 13 that may be achieved or set by the robot 10 is found.

As soon as an achievable target pose $^0H_f$ for the robot flange 13 has been found, the method follows a path 23 to a method act S11.

In the method act S11, the control device 18 creates a control signal for the robot 10 by which the robot flange 13 may be moved or transferred from the current pose of the robot 10 into the specific target pose $^{0}H_{f}$.

Then, this control signal is communicated to the robot 10 in a method act S12 and accordingly the robot flange 13 positioned in the specific target pose $^{0}H_{f}$ as a result of which the tool 4 reaches the specified target pose.

In contrast to the conventional method initially described with reference to FIG. 1, the method described here supplies the same orientation of the x-axis $x_{r}$ and the second axis 6 as in the starting pose 2 for the end pose 3. Because in the example shown, the z-axis $^{0}z_{r}$, e.g., the axis of symmetry 15 of the tool 4, is the same in the starting pose 2 and in the end pose 3, the x- and y-axes of the target coordinate system $\{r\}$ determined, for example, according to equation (1) for the starting pose 2 and the end pose 3 or between these two poses 2, 3, e.g., for the movement from the starting pose 2 to the end pose 3, are the same. This means that, during the movement or displacement from the starting pose 2 into the end pose 3, the tool 4 retains the same orientation so that no rotational movement of the tool 4 occurs. As a result, the marker 16 remains visible in both the starting pose 2 and the end pose 3 or between two poses 2, 3 which advantageously enables improved trackability and ultimately inherently dependable operation of the robot 10.

Although the disclosure has been illustrated and described in detail by the exemplary embodiments, the disclosure is not restricted by the disclosed examples and the person skilled in the art may derive other variations from this without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for operating a robot for positioning a tool in a target pose, wherein the robot comprises a robot foot and a movable robot arm attached thereto on a distal end of which a robot flange is arranged, on which the tool is held, the method comprising:
   specifying, by a processor, an axis of the tool;
   specifying, by the processor, a Cartesian reference coordinate system $\{0\}$ originating on the robot foot;
   specifying, by the processor, a Cartesian target coordinate system $\{r\}$ originating on a point of the tool, a z-axis corresponding to the axis of the tool, and an x-axis and a y-axis each with initially indeterminate orientations;
   specifying, by the processor, three-dimensional spatial coordinates of the point of the tool and an orientation of the axis, expressed in each case in the reference coordinate system $\{0\}$, as part of the target pose for the tool;
   calculating orientations of the x-axis and the y-axis of the target coordinate system $\{r\}$ expressed in the reference coordinate system $\{0\}$ by: (1) a first cross product of a specified orientation of the axis and a direction vector, which is not parallel thereto, of a coordinate axis ($x_{0}$, $y_{0}$, $z_{0}$) of the reference coordinate system $\{0\}$, and (2) a second cross product of a result of the first cross product and the specified orientation of the axis expressed in the reference coordinate system; and
   creating a 4×4 matrix, which defines a pose $^{0}H_{r}$ of the target coordinate system $\{r\}$ with reference to the reference coordinate system $\{0\}$ from the orientations of the coordinate axes ($^{0}x_{r}$, $^{0}y_{r}$, $^{0}z_{r}$) of the target coordinate system $\{r\}$ expressed in each case in the reference coordinate system $\{0\}$ and the three-dimensional spatial coordinates ($^{0}t_{r}$) of the point of the tool and from an additional 1×4 line vector.

2. The method of claim 1, wherein the orientation $^{0}y_{r}$ of the y-axis of the target coordinate system $\{r\}$ is calculated by the first cross product as $$^{0}y_{r}=^{0}z_{r}\times x_{0}$$

and the orientation $^{0}x_{r}$ of the x-axis of the target coordinate system $\{r\}$ is calculated by the second cross product as $$^{0}x_{r}=^{0}y_{r}\times ^{0}z_{r},$$

wherein, when the z-axis of the target coordinate system $\{r\}$ corresponding to the specified axis of the tool is parallel to the x-axis $x_{0}$ of the reference coordinate system $\{0\}$, the orientations $^{0}x_{r}$ and $^{0}y_{r}$ are calculated by the first and second cross product as $$^{0}x_{r}=y_{0}\times ^{0}z_{r} \text{ and } 0y_{r}=^{0}z_{r}\times ^{0}x_{r},$$

wherein, in each case, $x_{0}$ and $y_{0}$ indicate the x- or y-axes of the reference coordinate system $\{0\}$ and $^{0}x_{r}$, $^{0}y_{r}$, $^{0}z_{r}$ indicate the coordinate axes of the target coordinate system $\{r\}$ expressed in the reference coordinate system $\{0\}$ in vector form.

3. The method of claim 1, wherein a pose $'H_{f}$ of the robot flange, corresponding to the pose $^{0}H_{r}$ of the target coordinate system $\{r\}$ and expressed therein, is determined from a specified calibration, which indicates a spatial positional relationship between the point of the tool and the robot flange.

4. The method of claim 3, wherein, for the specified calibration, a marker in a specified positional relationship to the point of the tool is arranged thereupon or on the robot and is detected by a detection facility, which is arranged in a specified positional relationship to the robot foot, in an auxiliary coordinate system $\{e\}$ originating at the point of the tool and with an initially indeterminate orientation relative to the target coordinate system $\{r\}$,
   wherein a spatial positional relationship of the auxiliary coordinate system $\{e\}$ relative to the robot flange is determined from corresponding detection data of the marker provided by the detection facility, and
   wherein the pose $'H_{f}$ of the robot flange is determined from the orientations of the axes ($^{0}x_{r}$, $^{0}y_{r}$, $^{0}z_{r}$) of the target coordinate system $\{r\}$ expressed in the reference coordinate system $\{0\}$ and specified forward kinematics of the robot using an identical origin of the target coordinate system $\{r\}$ and the auxiliary coordinate system $\{e\}$.

5. The method of claim 4, wherein the marker is an optical marker.

6. The method of claim 3, wherein, from the poses $^{0}H_{r}$ and $'H_{f}$, a pose $^{0}H_{f}$ of the robot flange corresponding to the determined pose $^{0}H_{r}$ of the target coordinate system $\{r\}$ is determined with reference to the reference coordinate system $\{0\}$ as:

$$^{0}H_{f}=^{0}H_{r}{}'H_{f}$$

7. The method of claim 1, wherein a control signal for the robot is automatically created from variables determined and a specified kinematic model of the robot by which the robot is moved out of its current pose in each case such that the tool is transferred into the target pose specified therefor.

8. The method of claim 1, wherein a specified kinematic model of the robot is used automatically to check whether the target pose specified for the tool is achievable by the robot, and
when the target pose is not achievable, the target coordinate system $\{r\}$ is rotated by specified incrementally increasing angular amounts alternately in positive and negative directions about the z-axis until an achievable target pose is found, wherein, for each rotation, a direction of rotation is changed with reference to a preceding rotation in each case and a next higher of the specified angular amounts is used in each case, and the check is performed again after each rotation.

9. A robot comprising:
a control device for controlling the robot;
a data memory; and
a processor connected to the data memory for executing program code, and with an interface for receiving specifications, wherein the processor is configured to:
specify an axis of a tool;
specify a Cartesian reference coordinate system $\{0\}$ originating on a foot of the robot;
specify a Cartesian target coordinate system $\{r\}$ originating on a point of the tool, a z-axis corresponding to the axis of the tool, and an x-axis and a y-axis each with initially indeterminate orientations;
specify three-dimensional spatial coordinates of the point of the tool and an orientation of the axis, expressed in each case in the reference coordinate system $\{0\}$, as part of the target pose for the tool;
calculate orientations of the x-axis and the y-axis of the target coordinate system $\{r\}$ expressed in the reference coordinate system $\{0\}$ by: (1) a first cross product of a specified orientation of the axis and a direction vector, which is not parallel thereto, of a coordinate axis ($x_0$, $y_0$, $z_0$) of the reference coordinate system $\{0\}$, and (2) a second cross product of a result of the first cross product and the specified orientation of the axis expressed in the reference coordinate system; and
create a 4×4 matrix, which defines a pose $^0H_r$ of the target coordinate system $\{r\}$ with reference to the reference coordinate system $\{0\}$ from the orientations of the coordinate axes ($^0x_r$, $^0y_r$, $^0z_r$) of the target coordinate system $\{r\}$ expressed in each case in the reference coordinate system $\{0\}$ and the three-dimensional spatial coordinates ($^0t_r$) of the point of the tool and from an additional 1×4 line vector.

10. A robot system comprising:
a robot and a detection facility coupled thereto and arranged in a specified positional relationship thereto for detecting a marker arranged on the robot,
wherein the robot system is configured automatically to determine an orientation of the marker from detection data provided by the detection facility, and
wherein the robot system is further configured to:
specify an axis of a tool;
specify a Cartesian reference coordinate system $\{0\}$ originating on a foot of the robot;
specify a Cartesian target coordinate system $\{r\}$ originating on a point of the tool, a z-axis corresponding to the axis of the tool, and an x-axis and a y-axis each with initially indeterminate orientations;
specify three-dimensional spatial coordinates of the point of the tool and an orientation of the axis, expressed in each case in the reference coordinate system $\{0\}$, as part of the target pose for the tool;
calculate orientations of the x-axis and the y-axis of the target coordinate system $\{r\}$ expressed in the reference coordinate system $\{0\}$ by: (1) a first cross product of a specified orientation of the axis and a direction vector, which is not parallel thereto, of a coordinate axis ($x_0$, $y_0$, $z_0$) of the reference coordinate system $\{0\}$, and (2) a second cross product of a result of the first cross product and the specified orientation of the axis expressed in the reference coordinate system; and
create a 4×4 matrix, which defines a pose $^0H_r$ of the target coordinate system $\{r\}$ with reference to the reference coordinate system $\{0\}$ from the orientations of the coordinate axes ($^0x_r$, $^0y_r$, $^0z_r$) of the target coordinate system $\{r\}$ expressed in each case in the reference coordinate system $\{0\}$ and the three-dimensional spatial coordinates ($^0t_r$) of the point of the tool and from an additional 1×4 line vector.

11. The robot system of claim 10, wherein the marker is an optical marker.

* * * * *